(12) United States Patent
Kishimoto et al.

(10) Patent No.: US 8,345,147 B2
(45) Date of Patent: Jan. 1, 2013

(54) IMAGE PICKUP APPARATUS (75) Inventors: Tsuyoshi Kishimoto, Hyogo (JP); Hisamo Sogawa, Hyogo (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 12/594,435

(22) PCT Filed: Apr. 7, 2008

(86) PCT No.: PCT/JP2008/056874
§ 371 (c)(1), (2), (4) Date: Oct. 2, 2009

(87) PCT Pub. No.: WO2008/142920
PCT Pub. Date: Nov. 27, 2008

(65) Prior Publication Data
US 2010/0066856 A1    Mar. 18, 2010

(30) Foreign Application Priority Data
May 18, 2007 (JP) ................. 2007-132698

(51) Int. Cl.
G03B 13/00 (2006.01)
H04N 5/225 (2006.01)
H04N 5/222 (2006.01)
G06K 9/00 (2006.01)

(52) U.S. Cl. .................. 348/345; 348/341; 348/333.01; 382/103; 382/107

(58) Field of Classification Search .................. 348/345, 348/341, 333.01; 382/103, 107
See application file for complete search history.

(56) References Cited

U.S. PATENT DOCUMENTS

| | | | |
|---|---|---|---|
| 5,365,302 A | 11/1994 | Kodama | |
| 5,579,078 A | 11/1996 | Suzuki | |
| 6,332,061 B1* | 12/2001 | Arita | 396/104 |
| 7,412,159 B2* | 8/2008 | Ichimiya | 396/104 |
| 2004/0004670 A1* | 1/2004 | Yamashita | 348/345 |
| 2005/0168621 A1 | 8/2005 | Kageyama et al. | |
| 2006/0165403 A1 | 7/2006 | Ito | |
| 2007/0030375 A1 | 2/2007 | Ogasawara et al. | |
| 2007/0064977 A1* | 3/2007 | Nagata | 382/107 |
| 2008/0080739 A1* | 4/2008 | Muramatsu | 382/103 |
| 2009/0262233 A1 | 10/2009 | Kishimoto et al. | |

FOREIGN PATENT DOCUMENTS

JP  4 138434  5/1992

(Continued)

Primary Examiner — Chieh M Fan
Assistant Examiner — Quang Le
(74) Attorney, Agent, or Firm — Oblon, Spivak, McClelland, Maier & Neustadt, L.L.P.

(57) ABSTRACT

An image pickup apparatus that can decrease the probability of an image in which a main subject is not in focus being captured is provided. An image pickup apparatus 1A includes two image pickup devices 5 and 7 that capture an image relating to a subject image made incident through an image capturing lens, a main subject detecting unit 122 that detects a main subject in the captured image, a phase difference AF control unit 121 that performs focus control on the basis of a phase difference detection signal acquired from a ranging area set in an imaging area, a determination unit 123 that determines whether the main subject is present in the ranging area, and a warning control unit 126 that, if the determination unit 123 determines that the main subject is not present in the ranging area, performs predetermined control for preventing a state in which the main subject is not in focus.

6 Claims, 10 Drawing Sheets

FOREIGN PATENT DOCUMENTS

| | | |
|---|---|---|
| JP | 4 138436 | 5/1992 |
| JP | 6 294927 | 10/1994 |
| JP | 2003 163827 | 6/2003 |
| JP | 2005 221602 | 8/2005 |
| JP | 2006 227080 | 8/2006 |
| JP | 2006 235616 | 9/2006 |
| JP | 2007 68147 | 3/2007 |
| JP | 2008 61157 | 3/2008 |

* cited by examiner

| RELEASE BUTTON | MIRROR STATE | OPERATION PERFORMED BY IMAGE PICKUP APPARATUS |
|---|---|---|
| NO OPERATION | UP | LIVE VIEW |
| S1 STATE | DOWN | PHASE DIFFERENCE AF |
| S2 STATE | UP | CAPTURING OPERATION OF IMAGE TO BE RECORDED |

IMAGE PICKUP APPARATUS

TECHNICAL FIELD

The present invention relates to an image pickup apparatus.

BACKGROUND ART

For digital cameras, a technology in which an autofocus (AF) operation using a contrast method (also referred to as a "contrast AF" operation) based on an image signal acquired from an image pickup device is performed has been developed. For example, Japanese Unexamined Patent Application Publication No. 2006-227080 describes a technology in which a face region of a subject in an image to be captured is identified, and a contrast AF operation is performed on the basis of an image signal from a ranging area including the face region.

In contrast, in recent years, digital single-lens reflex cameras (DSLRs) have been widely used. The DSLRs employ an AF method using a phase difference detection method (hereinafter also referred to as a "phase difference AF").

In the phase difference AF, a focus position of a focus lens is computed using subject's light in a ranging area set within a field of view, that is, in an imaging area.

However, the ranging area for phase difference AF is fixedly set in a predetermined area in the imaging area. Accordingly, in a composition determined by a photographer (also referred to as a "user"), if a main subject is not included in the ranging area, an appropriate image to be captured in which the main subject is in focus, as described in Japanese Unexamined Patent Application Publication No. 2006-227080, may not be obtained.

In addition, such a problem may occur in not only digital single-lens reflex cameras but also in all digital cameras that employ phase difference AF as an AF method.

Accordingly, it is an object of the present invention to provide an image pickup apparatus that can decrease the probability of an image in which a main subject is not in focus being captured.

DISCLOSURE OF INVENTION

According to a first aspect of the present invention, an image pickup apparatus is provided. The image pickup apparatus is characterized in that it comprises an image pickup device for capturing an image relating to a subject image, subject detecting means for detecting, from the captured image, a main subject set as a subject to be focused upon, first focusing means for performing phase difference focus control on the basis of a phase difference detection signal acquired from a ranging area set in an imaging area at a predetermined position, determination means for, when the main subject is detected by the subject detecting means, determining whether the main subject is present in the ranging area, and control means for, if the determination means determines that the main subject is not present in the ranging area, performing predetermined control for preventing a state in which the main subject is not in focus.

In addition, according to a second aspect of the present invention, an image pickup apparatus is provided. The image pickup apparatus is characterized in that it comprises a first image pickup device for capturing a first image relating to a subject image to be actually recorded, a second image pickup device for capturing a second image relating to the subject image before the first image is actually recorded, subject detecting means for detecting a main subject set as a subject to be focused upon from the second captured image, first focusing means for performing phase difference focus control on the basis of a phase difference detection signal acquired from a ranging area set in an imaging area at a predetermined position, determination means for, when the main subject is detected by the subject detecting means, determining whether the main subject is present in the ranging area, and control means for, if the determination means determines that the main subject is not present in the ranging area, performing predetermined control for preventing a state in which the main subject is not in focus.

According to the present invention, a main subject in an image to be captured is detected, and it is determined whether the main subject is present in a ranging area from which a phase difference detection signal is acquired. Subsequently, if it is determined that the main subject is not present in the ranging area, predetermined control is performed in order to prevent an unfocused state of the main subject. Therefore, it is possible to decrease the probability of an image in which a main subject is not in focus being captured.

BEST MODES FOR CARRYING OUT THE INVENTION

Embodiments of the present invention are described below with reference to the accompanying drawings.

1. First Embodiment

<1-1. Configuration>

Figure 1:
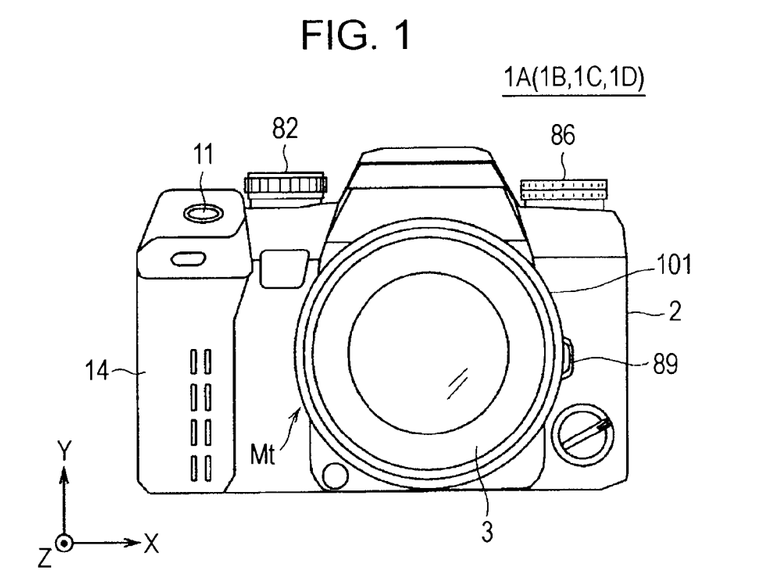
FIG. 1 illustrates the external configuration of an image pickup apparatus according to a first embodiment of the present invention.
Figure 2:
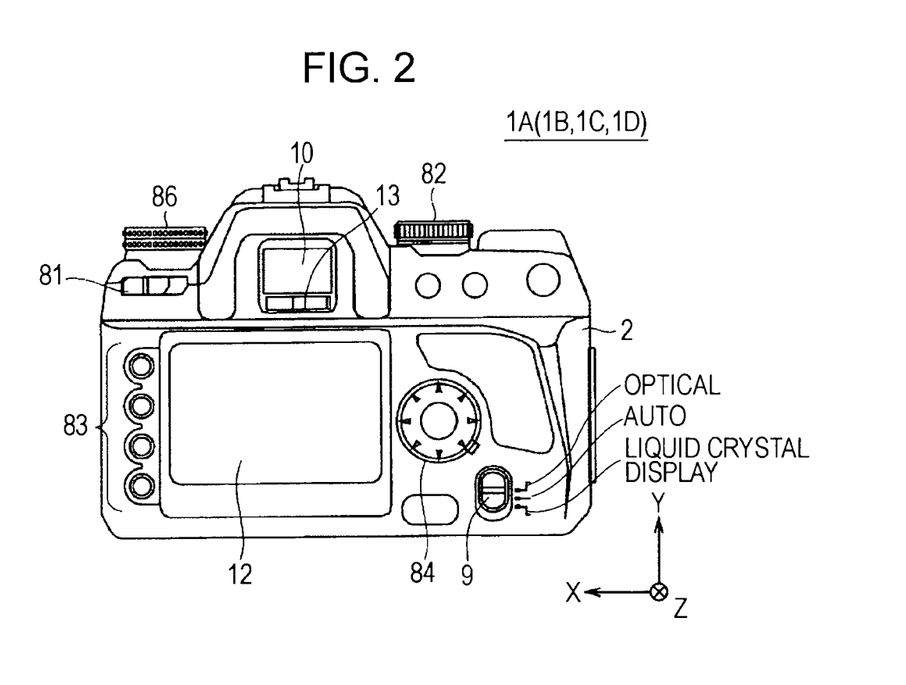
FIG. 2 illustrates the external configuration of the image pickup apparatus according to the first embodiment of the present invention.

FIGS. 1 and 2 illustrate the external configuration of an image pickup apparatus 1A according to a first embodiment of the present invention. Here, FIG. 1 is a front external view of the image pickup apparatus 1A, while FIG. 2 is a back external view of the image pickup apparatus 1A. The image pickup apparatus 1A is configured so as to be a digital camera of a lens interchangeable single-lens reflex type.

As shown in FIG. 1, the image pickup apparatus 1A includes a camera main unit (a camera body) 2. An interchangeable image-capturing lens unit (an interchangeable lens) 3 is removably mounted on the camera main unit 2.

The image-capturing lens unit 3 primarily includes a lens barrel 101. The image-capturing lens unit 3 further includes a lens group 37 (refer to FIG. 3) and an aperture (not shown) disposed inside the lens barrel 101. The lens group 37 includes a focus lens that is moved along an optical axis direction so as to change a focus position.

The camera main unit 2 includes, at substantially the front center thereof, a ring-shaped mount unit Mt on which the image-capturing lens unit 3 is mounted. The camera main unit 2 further includes a detaching button 89 in the vicinity of the ring-shaped mount unit Mt. The detaching button 89 is used for mounting and demounting the image-capturing lens unit 3.

The camera main unit 2 further includes a mode setting dial 82 at the front upper left and a control value setting dial 86 at the front upper right. By operating the mode setting dial 82, a photographer can perform a setting operation (a setting switching operation) of various modes of the camera. Examples of the various modes include a variety of shooting modes (e.g., a portrait mode, a landscape mode, and a continuous shooting mode), a playback mode in which a captured image is played back, and a communication mode in which data is exchanged with an external apparatus). In addition, by operating the control value setting dial 86, the photographer can set control values for each of the various shooting modes.

The camera main unit 2 further includes a grip unit 14 that the photographer grasps at the front left end. A release button 11 is disposed on the top surface of the grip unit 14. The release button 11 is used for instructing start of exposure. A battery container and a card container are disposed inside the grip unit 14. For example, the battery container contains four AAA size dry batteries that provide power to the camera, and the card container contains a removable memory card 90 (refer to FIG. 5) for recording image data of a captured image.

The release button 11 is a two-step detection button that can detect the following two states: a halfway pressed down state (an S1 state) and a fully pressed down state (an S2 state). When the release button 11 is pressed halfway down and enters the S1 state, an operation for preparing to capture a recording still image of a subject (an actually recorded image) is performed (e.g., an AF control operation and an AE control operation are performed). When the release button 11 is further pressed down and enters the S2 state, an image capturing operation relating to the actually recorded image is performed (an exposure operation of the subject is performed using an image pickup device (also referred to as a "main image pickup device") 5 and, subsequently, image processing is performed on an image signal obtained through the exposure operation).

As shown in FIG. 2, a monitor 12 is disposed on the back surface of the camera main unit 2 at substantially the center thereof. For example, the monitor 12 is formed from a color liquid crystal display (LCD). The monitor 12 can display a menu screen used for setting a shooting condition.

In addition, the monitor 12 can display a captured image recorded in the memory card 90 in a playback mode.

A viewfinder window 10 is disposed on the back surface of the camera main unit 2 at substantially the upper center thereof. A subject image is led from the image-capturing lens unit 3 to the viewfinder window 10. Through the viewfinder window 10, the photographer can view an image equivalent to the subject image captured by the main image pickup device 5. More specifically, a subject image made incident on an image capturing optical system is reflected upwards by a mirror mechanism 6 (refer to FIG. 3) and is viewed through an eyepiece lens 67. In this way, by viewing through the viewfinder window 10, the photographer can determine the composition. Note that, when the S2 state of the release button 11 is detected and the image capturing operation regarding an actually recorded image is started, the mirror mechanism 6 is moved away from an optical path of a light beam that forms a subject image. Accordingly, the light beam output from the image-capturing lens unit 3 (the light beam that forms the subject image) reaches the main image pickup device 5. Thus, a captured image (image data) relating to the subject can be obtained.

An eye proximity detecting sensor 13 is disposed under the viewfinder window 10. The eye proximity detecting sensor 13 detects whether an object is in proximity thereto. In this case, the eye proximity detecting sensor 13 detects whether the photographer is using the viewfinder or not.

A main switch 81 is provided at the upper left corner of the monitor 12. The main switch 81 is a dual contact slide switch. When the main switch 81 is set to the "OFF" position on the left, the image pickup apparatus 1A is powered off. In contrast, when the main switch 81 is set to the "ON" position on the right, the image pickup apparatus 1A is powered on.

A direction selection key 84 and the display changeover switch 9 are provided on the right side of the monitor 12. The direction selection key 84 includes a circular operation button. The direction selection key 84 can detect a push operation on each of four portions (upper, lower, left, and right portions) of the circular operation button. The direction selection key 84 can further detect a push operation on each of upper right, upper left, lower right, and lower left portions of the circular operation button. The direction selection key 84 includes a push button at the center thereof and can detect a push operation on the center push button in addition to the above-described push operation to indicate one of the eight directions.

A display changeover switch 9 is a three-point slide switch. When the contact point of the display changeover switch 9 is set to the "OPTICAL" position in the upper section, an OVF mode is selected. Thus, a subject image is displayed in a view area of the optical viewfinder. Thus, the photographer can view an image in the view area of the optical viewfinder through the viewfinder window 10 and perform a composition determining operation (also referred to as "framing").

In contrast, when the contact point of the display changeover switch 9 is set to the "LIQUID CRYSTAL DISPLAY" position in the lower position, an EVF mode is selected. Accordingly, a live view image of the subject is displayed on the monitor 12 in the form of a moving image. In this way, the photographer can view the live image displayed on the monitor 12 and perform framing.

Furthermore, when the contact point of the display changeover switch 9 is set to the "AUTO" position in the middle, display of the image in the view area of the optical viewfinder and display of the live view image is automatically switched in accordance with proximity of the eyes to the viewfinder window 10. In this way, by viewing one of an image in the view area of the optical viewfinder and a live view image, the photographer can perform framing.

A setting button group 83 including a plurality of buttons used for, for example, setting the menu screen and deleting an image is disposed on the left side of the monitor 12.

Figure 3:
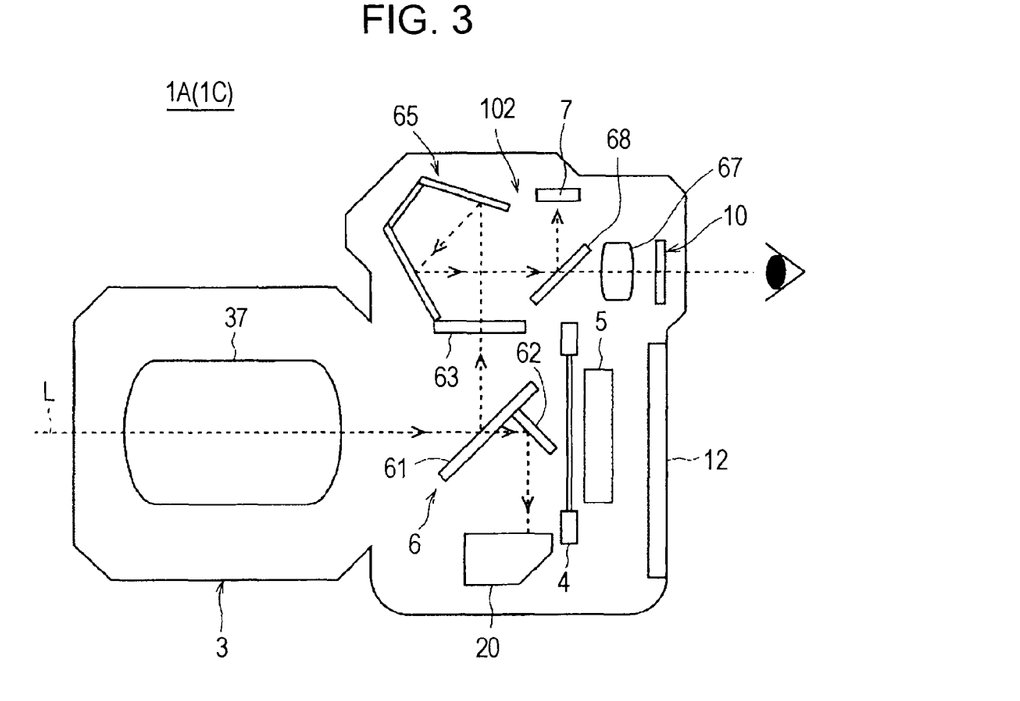
FIG. 3 is a longitudinal sectional view of the image pickup apparatus according to the first embodiment.
Figure 4:
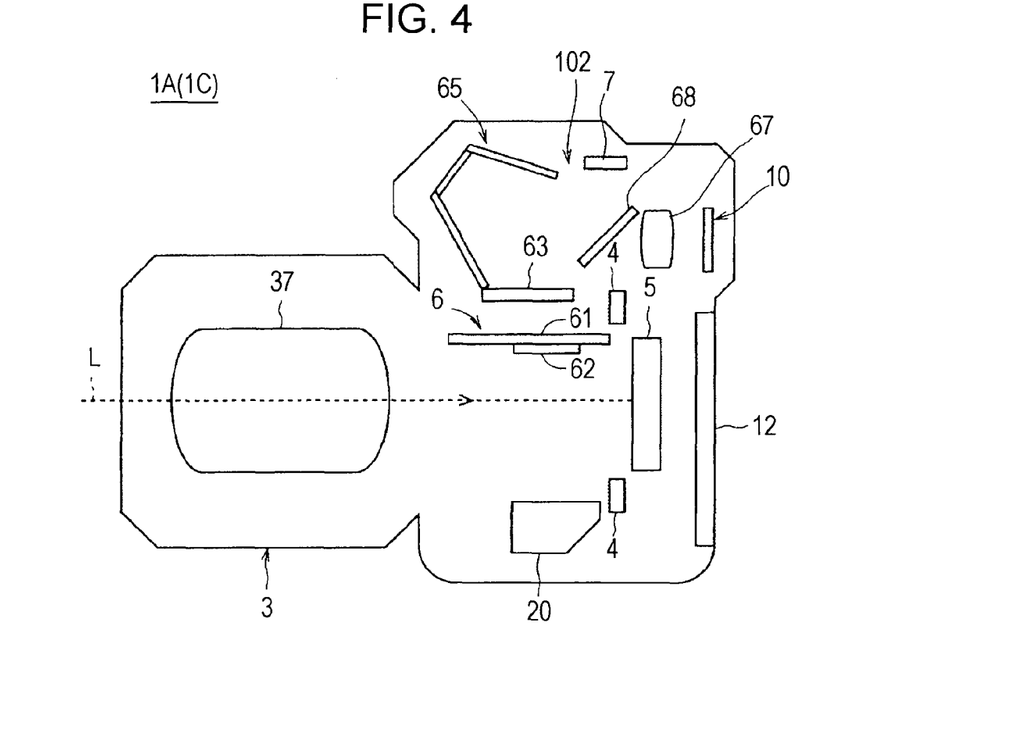
FIG. 4 is a longitudinal sectional view of the image pickup apparatus according to the first embodiment.

The internal configuration of the image pickup apparatus 1A is described next. FIGS. 3 and 4 are cross-sectional views of the image pickup apparatus 1A according to the first embodiment.

As shown in FIG. 3, the image pickup apparatus 1A includes a finder unit 102 (a finder optical system), the mirror mechanism 6, a phase difference AF module (hereinafter simply referred to as an "AF module") 20, a shutter 4, the main image pickup device 5, and a sub-image pickup device 7.

The main image pickup device 5 (a CCD sensor (also simply referred to as a "CCD") in the present embodiment) is disposed on an optical axis L of the lens group 37 included in the image-capturing lens unit 3 and in a plane perpendicular to the optical axis L. The main image pickup device 5 photoelectrically converts a subject image received by an imaging plane thereof into an electrical signal and generates an image signal relating to an image to be actually recorded.

In addition, the shutter 4 is disposed immediately before the main image pickup device 5. The shutter 4 includes a curtain member movable in the vertical direction. The shutter 4 is a mechanical focal plane shutter that opens and closes the optical path of subject's light directed to the main image pickup device 5 along the optical axis L.

The mirror mechanism 6 (a reflector plate) is disposed on the optical axis L at a position at which the subject's light is reflected towards the finder unit 102. The subject's light that has passed through the image-capturing lens unit 3 is reflected upwards by the mirror mechanism 6 (a main mirror 61 described below) and is focused on a focusing glass 63.

The finder unit 102 includes a pentamirror 65, a half mirror 68, an eyepiece lens 67, the sub-image pickup device 7, and the viewfinder window 10. The pentamirror 65 reverses the upside-down subject image and laterally reverses the subject image by reflection so that an upright image can be obtained. The half mirror 68 is disposed between the pentamirror 65 and the eyepiece lens 67. The half mirror 68 separates (branches) the subject's light beam. One of the separate subject's light beams is directed to the eyepiece lens 67 and the sub-image pickup device 7. The eyepiece lens 67 directs the separate subject's light beam to the outside of the viewfinder window 10. Thus, the photographer can view the subject image through the viewfinder window 10. In this way, the finder unit 102 functions as an optical viewfinder (OVF) for monitoring the subject during pre-shooting.

In contrast, the sub-image pickup device 7 receives the other separate subject's light beam. Thus, the sub-image pickup device 7 sequentially acquires captured images relating to the subject image. The acquired captured images are sequentially displayed on the monitor 12 in the form of a moving image (live view display). In this way, the subject image that is viewable through the viewfinder window 10 is captured by the sub-image pickup device 7, and the photographer can view the live view image relating to the subject image by using the monitor 12.

The mirror mechanism 6 includes the main mirror 61 and a sub-mirror 62. The sub-mirror 62 is disposed on the back side of the main mirror 61 so as to be tiltable towards the back surface of the main mirror 61. For example, the main mirror 61 is configured as a half mirror, which allows a portion of the subject light beam to pass therethrough. The portion of the subject light beam that has passed through the main mirror 61 is reflected by the sub-mirror 62 and, subsequently, is directed to the AF module 20.

The mirror mechanism 6 is configured as a so-called quick-return mirror. In an exposure time when the S2 state of the release button 11 is detected, the mirror mechanism 6 is moved upward and is stopped at a position beneath the focusing glass 63 (refer to FIG. 4). Accordingly, the subject light beam output from the image-capturing lens unit 3 is not blocked by the mirror mechanism 6 and reaches the main image pickup device 5. Thus, the main image pickup device 5 is exposed to the subject light beam. After exposure is completed, the mirror mechanism 6 returns to the original position (the position indicated in FIG. 3).

The AF module 20 is configured as a so-called AF sensor including a ranging element that detects the focus information about a subject. More specifically, the AF module 20 receives a light beam that is output from a subject (more precisely, a light beam traveling via the mirror mechanism 6) and that reaches a ranging area (also referred to as a "focus area" or an "AF area"). Thereafter, the AF module 20 outputs a phase difference detection signal generated in accordance with the focus state of the subject image.

<1-2. Function Block>

Figure 5:
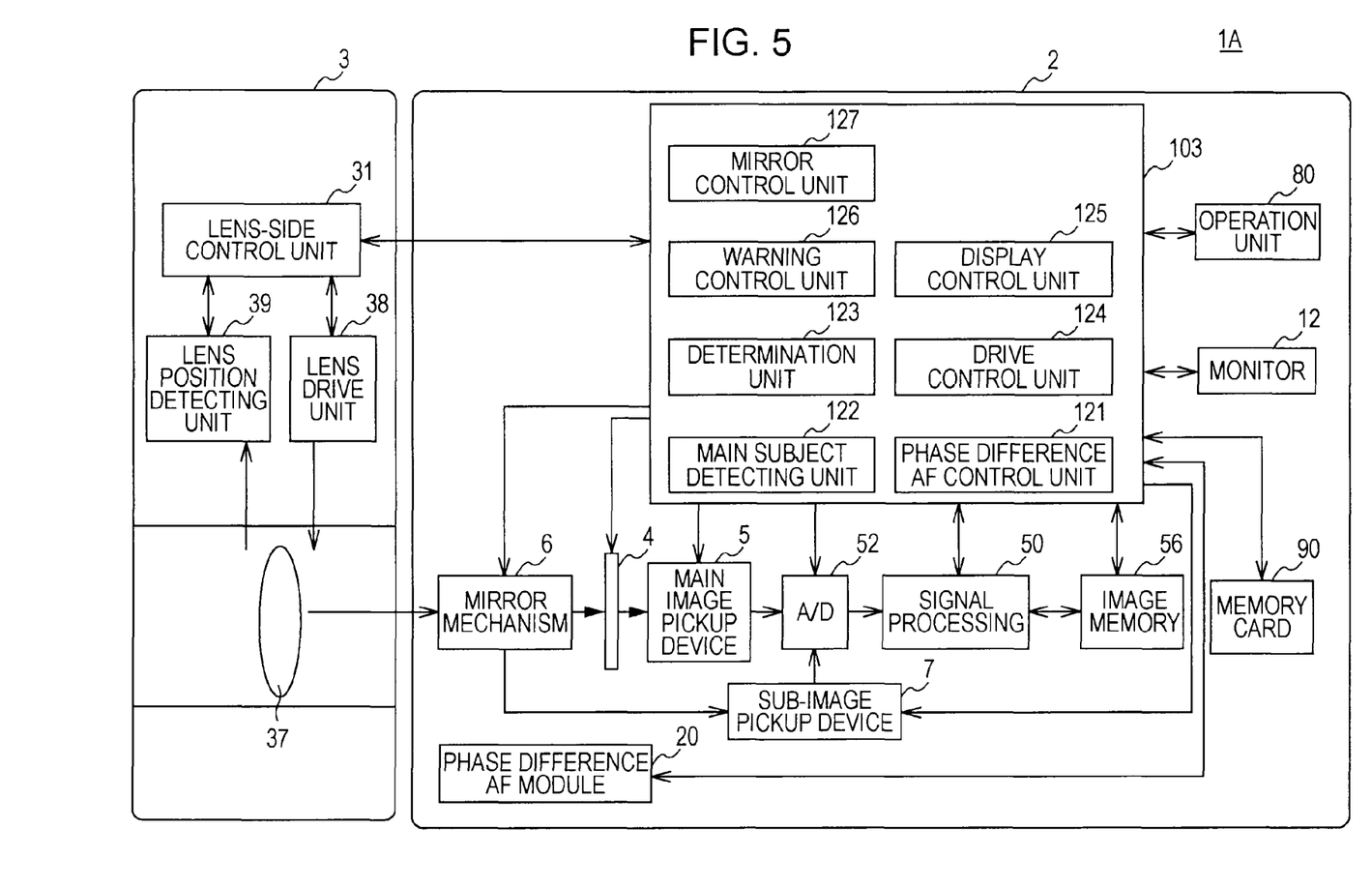
FIG. 5 is a block diagram of the functional structure of the image pickup apparatus according to the first embodiment.
Figure 6:
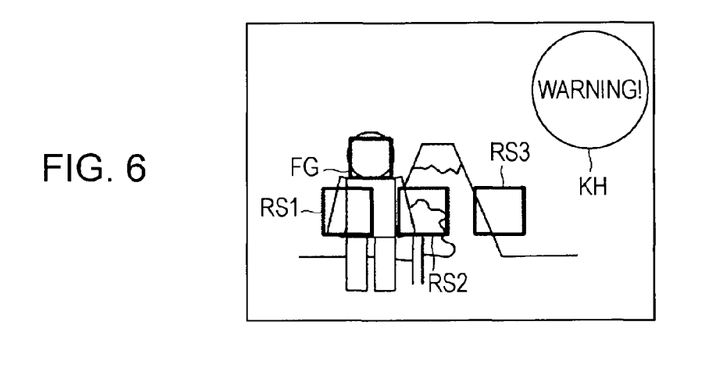
FIG. 6 illustrates a relationship between a ranging area and a face area in a captured image.

The outline of the function of the image pickup apparatus 1A is described next. FIG. 5 is a block diagram of the functional structure of the image pickup apparatus 1A according to the first embodiment. FIG. 6 illustrates a relationship between a ranging area and a face area in an image captured by the sub-image pickup device 7 (also referred to as an "auxiliary image").

As shown in FIG. 5, the image pickup apparatus 1A includes the phase difference AF module 20, an operation unit 80, a global control unit 103, the mirror mechanism 6, the shutter 4, the main image pickup device 5, an A/D converter circuit 52, a digital signal processing circuit 50, and an image memory 56.

The operation unit 80 includes a variety of buttons and switches including the release button 11 (refer to FIG. 1).

In response to user input operations on the operation unit 80, the global control unit 103 realizes a variety of operations.

In response to drive control signals (an accumulation start signal and an accumulation end signal) input from a timing control circuit (not shown), the main image pickup device 5 performs an exposure operation (an electrical charge accumulation operation through photoelectrical conversion) on the subject image formed on a light receiving surface (an imaging surface). Thus, the main image pickup device 5 generates an image signal relating to the subject image.

In addition, the sub-image pickup device 7 has a function basically similar to that of the main image pickup device 5. The sub-image pickup device 7 performs an exposure operation on the subject image directed to the finder optical system. In this way, an image signal relating to images for a live view is acquired.

The image signal (an analog signal) acquired by the main image pickup device 5 is converted into a digital signal by the A/D converter circuit 52. The digital image signal is input to the digital signal processing circuit 50.

The digital signal processing circuit 50 performs digital signal processing on the image signal input from the A/D converter circuit 52. More specifically, the digital signal processing circuit 50 performs signal processing, such as a black level correction process, a white balance (WB) correction process, and a γ correction process. The image signal (the image data) subjected to the signal processing is stored in the image memory 56.

The image memory 56 is a high-speed image memory that temporarily stores the generated image data. The image memory 56 has a memory capacity so as to store image data for a plurality of frames.

When a captured image is actually recorded, the image data temporarily stored in the image memory 56 is subjected to appropriate image processing (e.g., a compression process) by the global control unit 103. Thereafter, the image data is stored in the memory card 90.

In addition, the image data acquired by the sub-image pickup device 7 is subjected to predetermined processing performed by the A/D converter circuit 52 and the digital signal processing circuit 50. The image data is temporarily stored in the image memory 56. Thereafter, the image data is displayed on the monitor 12.

In addition, the global control unit 103 is configured as a microcomputer, which primarily includes a CPU, a memory, and a ROM. The global control unit 103 realizes a variety of functions by reading out a program stored in the ROM and executing the program using the CPU.

By executing the program, the global control unit 103 realizes the functions of a phase difference AF control unit 121, a main subject detecting unit 122, a determination unit 123, a drive control unit 124, a display control unit 125, a warning control unit 126, and a mirror control unit 127.

The phase difference AF control unit 121 performs an autofocus (AF) operation using a phase difference method (phase difference AF). More specifically, the phase difference AF control unit 121 performs a lens focus position identifying operation in which the position of the image-capturing lens (more precisely, the focus lens) in an in-focus state (the lens focus position) is identified on the basis of the phase difference detection signal output from the AF module 20. In addition, the phase difference AF control unit 121 performs a lens drive operation in which the image-capturing lens (the focus lens) is moved to the lens focus position in cooperation with the drive control unit 124.

The main subject detecting unit 122 identifies a main subject set as a focus target in the image (the auxiliary image) captured by the sub-image pickup device 7. Here, the face of a person (also referred to as a "face region") is set as a focus target, and the face region is detected from the auxiliary image. For example, in order to detect a face region, the following technology may be employed. That is, an area having a skin color is extracted from a captured image on the basis of pixel values of pixels of the image. If the area having a skin color is larger than or equal to a predetermined threshold value, the area having a skin color may be determined as the face of a person. Alternatively, by extracting feature parts of a face, such as the eyes and a mouth using a known pattern recognition technology, the face of a person may be detected.

In addition, the determination unit 123 determines, using the main subject detecting unit 122, whether the main subject detected in the captured image (the face region in the present embodiment) is present in the ranging area. This operation is described in more detail below.

The drive control unit 124 is a control unit that controls driving of a lens. The drive control unit 124 actually drives the image capturing lens in cooperation with the phase difference AF control unit 121.

More specifically, the phase difference AF control unit 121 transmits a control signal to a lens-side control unit 31 of the image-capturing lens unit 3 via the drive control unit 124. Thus, a lens drive unit 38 is driven, and the focus lens included in the lens group 37 of the image-capturing lens unit 3 is moved along the optical axis direction. In addition, the position of the focus lens is detected by a lens position detecting unit 39 of the image-capturing lens unit 3, and data indicating the position of the focus lens is sent from the lens-side control unit 31 to the global control unit 103 in the main body.

The display control unit 125 controls information displayed on a display unit, such as the monitor 12.

The warning control unit 126 is a control unit that outputs a warning sign indicating that the face region serving as a main subject is not present in the ranging area. For example, the warning control unit 126 outputs the warning sign onto the monitor 12 in cooperation with the display control unit 125. More specifically, as shown in FIG. 6, if a face area FG including a face region is not present in one of ranging areas RS1 to RS3, a warning message KH indicating that a face region is not present in a ranging area is superimposed on the image captured by the sub-image pickup device 7 (the live view image) and is displayed. Because of this warning message, an operator can recognize that a ranging target is not set on the main subject and, therefore, a focus operation is not appropriately performed.

The mirror control unit 127 controls switching between a state (a mirror up state) in which a mirror mechanism 6 is positioned away from a light path and a state (a mirror down state) in which the mirror mechanism 6 blocks the light path. The mirror control unit 127 switches between the mirror up state and the mirror down state by controlling driving of a mirror switching motor (not shown).

<1-3. Focus Operation>

Figure 7:
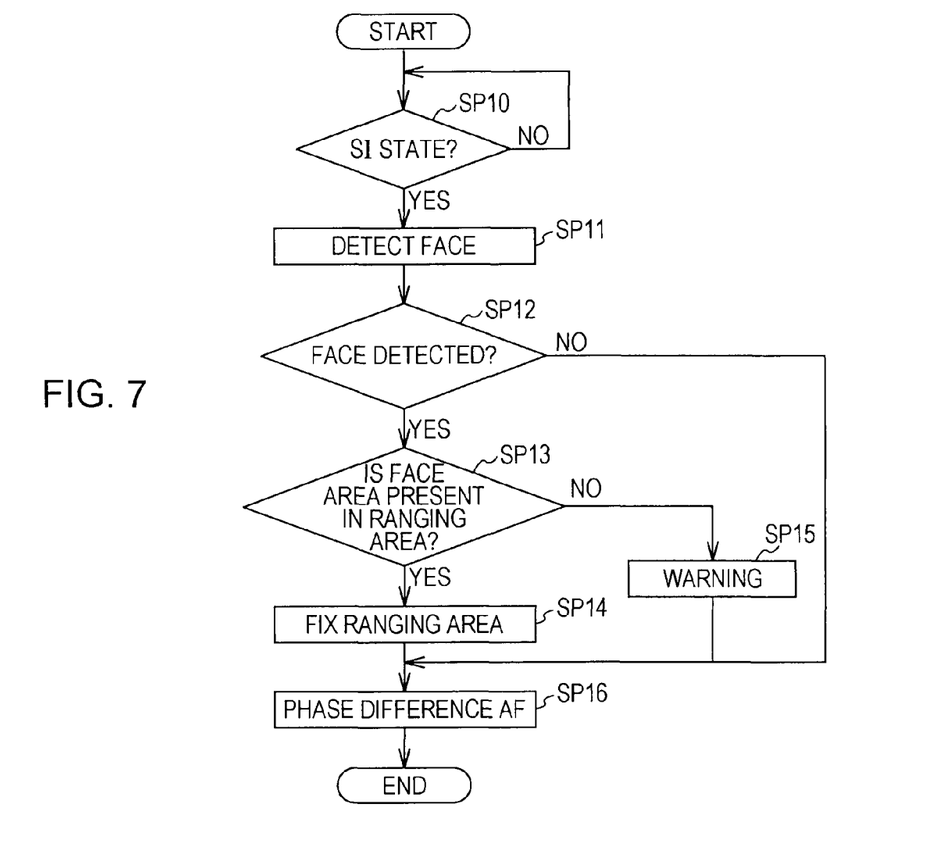
FIG. 7 is a flowchart of an autofocus operation performed by the image pickup apparatus according to the first embodiment.
Figure 8:
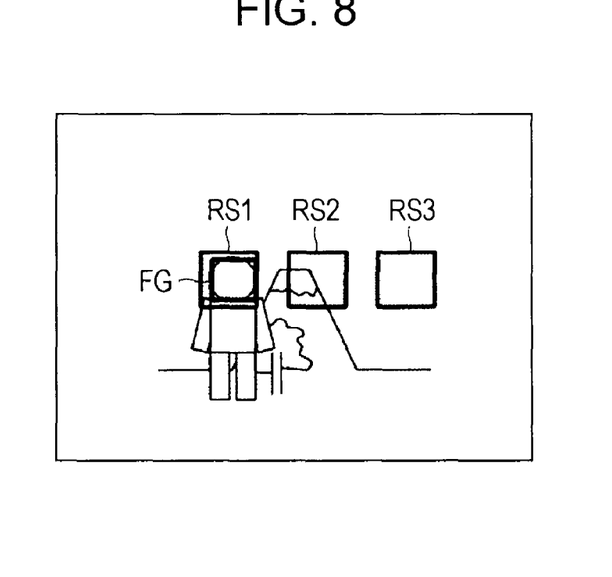
FIG. 8 illustrates a relationship between a ranging area and a face area in a captured image.
Figure 9:
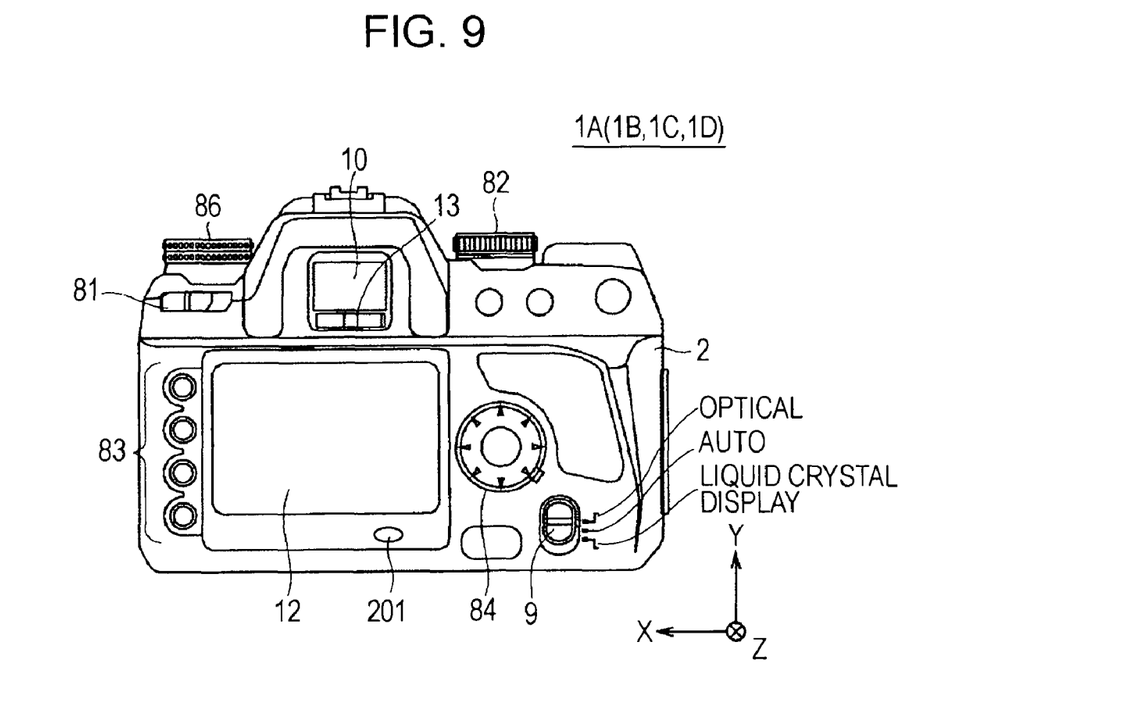
FIG. 9 is a diagram illustrating the external structure of the image pickup apparatus including a warning display unit.

The AF operation performed by the image pickup apparatus 1A according to the present embodiment is described next. FIG. 7 is a flowchart of the AF operation performed by the image pickup apparatus 1A according to the first embodiment. FIG. 8 illustrates a relationship between a ranging area in an image captured by the sub-image pickup device 7 and a face area. FIG. 9 is a diagram illustrating the external structure of the image pickup apparatus 1A including a warning display unit 201.

As shown in FIG. 7, when the S1 state of the release button 11 is detected (step SP10), the main subject detecting unit 122, in step SP11, detects the face of a person (a face region) in an image (an auxiliary image) captured by the sub-image pickup device 7. Thereafter, if a face region is detected, a rectangular area including the face region is identified as the face area FG. Note that, in order to detect the face region, the image that is captured by the sub-image pickup device 7 immediately before the S1 state of the release button 11 is detected and that is stored in the image memory 56 is used.

In step SP12, it is determined whether the face of a person is detected in the auxiliary image. If the face of a person is detected, the processing proceeds to step SP13. However, if the face of a person is not detected, the processing proceeds to step SP16.

In step SP13, the determination unit 123 determines whether the face area FG including the detected face region is present in the subject captured in the ranging area set as an imaging area.

More specifically, a ranging area (also referred to as a "corresponding ranging area" or an "equivalent ranging area") determined when a ranging area preset by the AF module 20 is set in the auxiliary image is identified. The coordinate values of each of the pixels in the corresponding ranging area of the auxiliary image are compared with the coordinate values of each of the pixels included in the face area FG. Thus, it is determined whether the pixel included in the face area FG is a pixel included in the corresponding ranging area. Note that the corresponding ranging area is determined when the image pickup apparatus 1A is produced.

The information about the corresponding ranging area is stored in a ROM (not shown) of the image pickup apparatus 1A.

In this way, in step SP13, if some of the pixels of the face area FG in the auxiliary image are present in the corresponding arranging area, it is determined that the face area FG is present in the ranging area set in the imaging area and, therefore, the ranging area is coincident with the face area FG.

If, in step SP13, it is determined that the face area FG is present in the ranging area (i.e., the ranging area is coincident with the face area FG), the processing proceeds to step SP14.

In step SP14, the ranging area is fixed. More specifically, the ranging area for acquiring a phase difference detection signal is fixed (set) so that the phase difference detection signal used for identifying the lens focus position is acquired from a particular ranging area in which it is determined that the face area FG is present. For example, as shown in FIG. 8, if the face area FG is present in a ranging area RS1 of three ranging areas RS1, RS2, and RS3, the lens focus position is computed (identified) using the phase difference detection signal acquired from the ranging area RS1. However, if, in step SP13, it is determined that the face area FG is not present in the ranging area (i.e., the ranging area is not coincident with the face area FG), the processing proceeds to step SP15.

In step SP15, a warning sign indicating that the face area FG is not present in the ranging area is output. For example, as shown in FIG. 6, the format of the warning sign may be a warning display KH on the monitor 12.

Alternatively, as shown in FIG. 9, a warning display unit 201 may be provided below the monitor 12. When a warning sign is output, the warning display unit 201 may be illuminated. Still alternatively, a sound generation unit may be provided, and the warning sign may be output in the form of voice sound or buzzer sound.

In step SP16, phase difference AF control is performed on the basis of the phase difference detection signal acquired from the AF module 20.

As described above, according to the present embodiment, the image pickup apparatus 1A detects a main subject set as a focus target from an auxiliary image captured by the sub-image pickup device 7. Thereafter, the image pickup apparatus 1A determines whether the main subject is present in a ranging area from which a phase difference signal is acquired. If it is determined that the main subject is not present in the ranging area, predetermined control for preventing the unfocused state of the main subject is performed (a warning sign is output to the photographer in this embodiment). Accordingly, the probability of capturing an unfocused image of the main subject can be decreased. That is, upon receiving a warning sign indicating that the main subject is not present in the ranging area, the photographer can easily eliminate the unfocused state of the main subject and perform an image capturing operation.

In addition, the photographer can easily recognize whether the main subject is in focus or not by determining whether a warning sign is present or not. Thus, by using an AF lock method in which the ranging area is placed on the face of a person so that the lens focus position is determined in advance and, subsequently, the composition is moved, the photographer can capture an image in which the main subject is in focus with a desired composition.

2. Second Embodiment

Figure 10:
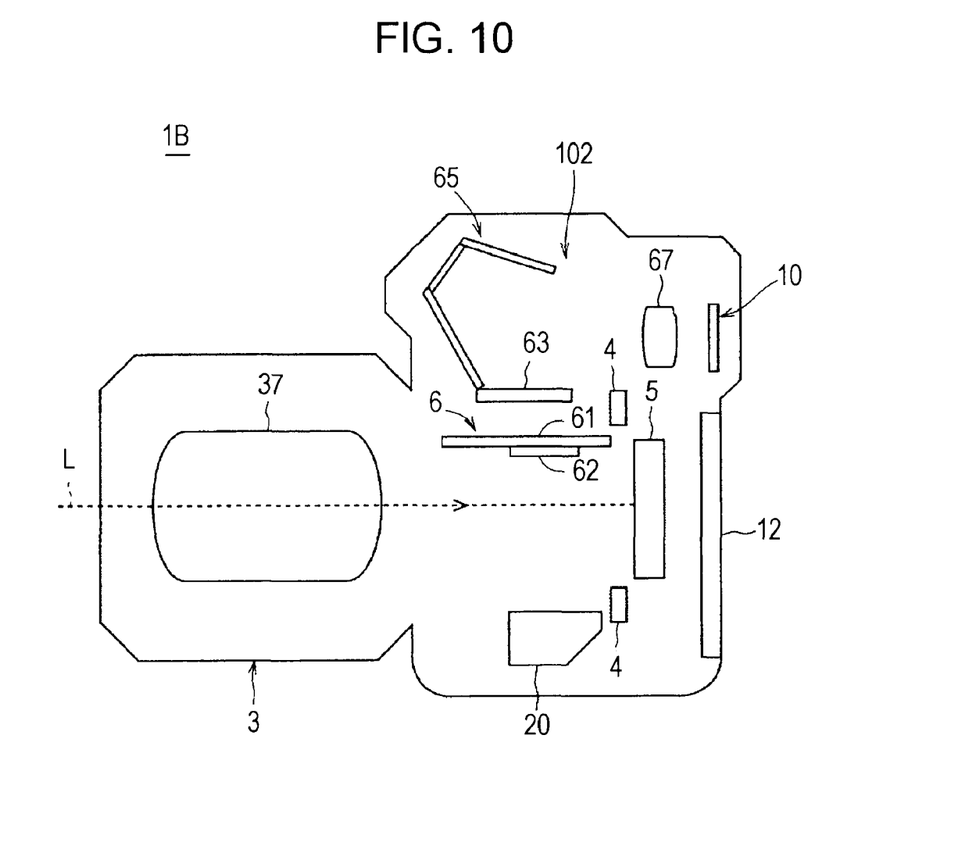
FIG. 10 is a cross-sectional view of an image pickup apparatus according to a second embodiment.
Figure 11:
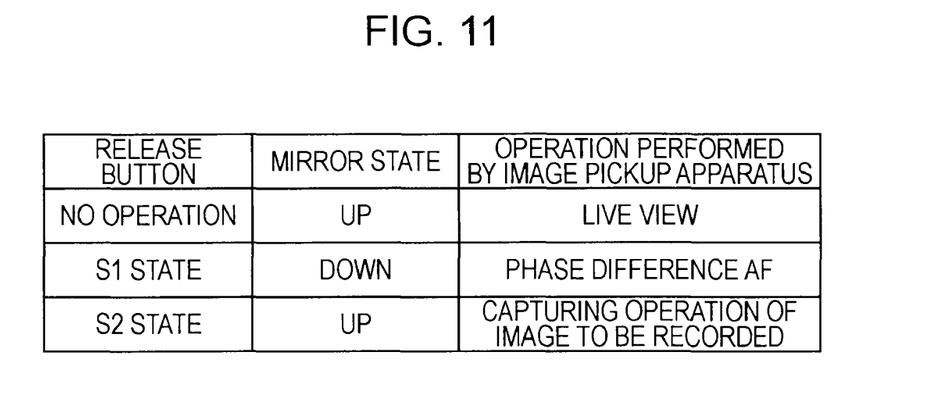
FIG. 11 is a diagram illustrating a relationship between a pressing state of a release button and the state of an operation performed by the image pickup apparatus.
Figure 12:
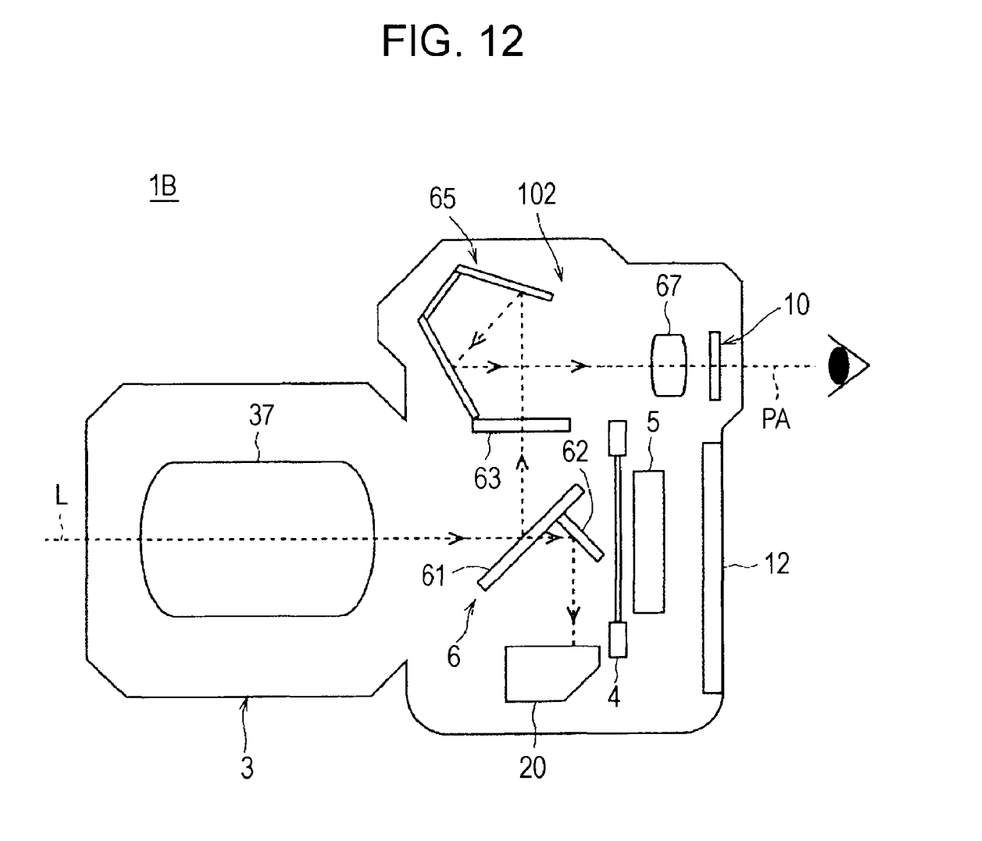
FIG. 12 is a cross-sectional view of the image pickup apparatus according to the second embodiment.

A second embodiment of the present invention is described next. The image pickup apparatus 1A according to the first embodiment includes two image pickup devices (more precisely, the main image pickup device 5 and the sub-image pickup device 7) and detects the face of a person on the basis of an image captured by the sub-image pickup device 7. Thus, the image pickup apparatus 1A identifies the face area. However, an image pickup apparatus 1B according to the second embodiment includes a single image pickup device and detects the face of a person on the basis of an image captured by the single image pickup device. Thus, the image pickup apparatus 1B identifies the face area. FIGS. 10 and 12 are cross-sectional views of the image pickup apparatus 1B according to the second embodiment. FIG. 11 is a diagram illustrating a relationship between a pressing state of the release button 11 and the operation performed by the image pickup apparatus 1B.

The image pickup apparatus 1B according to the second embodiment has a configuration and functions similar to those of the image pickup apparatus 1A (refer to FIGS. 1 and 2). However, unlike the image pickup apparatus 1A, as shown in FIG. 10, the image pickup apparatus 1B does not include the sub-image pickup device 7 and the half mirror 68. Hereinafter, the differences from the first embodiment are mainly described.

Like the image pickup apparatus 1A, the image pickup apparatus 1B has a live view display function. That is, the image pickup apparatus 1B has a mode in which a photographer can perform framing by viewing a live view image displayed on the monitor 12 (an EVF mode). The operation performed by the image pickup apparatus 1B in an EVF mode is schematically described below with reference to FIG. 11.

As shown in FIG. 11, if no operation is performed on the release button 11 in the EVF mode, the mirror mechanism 6 is moved away from the optical path of the subject light (refer to FIG. 10). In the mirror-up state caused by no operations of the release button 11, an image pickup device 5 of the image pickup apparatus 1B receives the subject light and sequentially captures images relating to the subject. Thereafter, the image pickup apparatus 1B sequentially displays the captured images on the monitor 12 in the form of a moving image.

Subsequently, when the release button 11 is pressed and, therefore, the image pickup apparatus 1B enters the S1 state, the mirror mechanism 6 blocks the optical path (refer to FIG. 12). In the mirror-down state caused by the S1 state of the release button 11, a portion of the subject light is reflected by a sub-mirror 62 and is directed to the AF module 20. Thereafter, the image pickup apparatus 1B performs a phase difference AF operation on the basis of a phase difference detection signal output from the AF module 20.

When the release button 11 is further pressed and, therefore, the image pickup apparatus 1B enters the S2 state, the mirror mechanism 6 enters a mirror up state again (refer to FIG. 10). An image capturing operation of an actually recorded image (an actual image capturing operation) is performed.

Like the image pickup apparatus 1A, in the image pickup apparatus 1B that performs the above-described operations in accordance with the pressing state of the release button 11, when a phase difference AF operation is performed, it is determined whether the face area (more precisely, the face area FG) is present in the ranging area.

More specifically, the image pickup apparatus 1B includes the main subject detecting unit 122 (refer to FIG. 5). In response to detection of the S1 state of the release button 11, the image pickup apparatus 1B detects the face (the face region) of a person from the image captured by the image pickup device 5 (step SP11 shown in FIG. 7). For example, an image captured by the image pickup device 5 immediately before the S1 state of the release button 11 is detected is used as the image captured by the image pickup device 5.

Thereafter, the determination unit 123 determines whether the face area FG including the detected face region is present in a subject that belongs to the ranging area (i.e., a subject included in the ranging area) (step SP13).

If the face area FG is present in the ranging area, the ranging area is fixed. Thereafter, a phase difference AF operation is performed on the basis of a phase difference detection signal acquired from the particular fixed ranging area (steps SP14 and SP16). However, if the face area FG is not present in the ranging area, a warning sign indicating that the face area FG is not present in the ranging area is output (step SP15).

As described above, according to the present embodiment, the image pickup apparatus 1B detects a main subject set as a focus target from an image captured by the single image pickup device. Thereafter, the image pickup apparatus 1B determines whether the main subject is present in a ranging area and captures an image to be actually recorded using the single image pickup device. In this way, the size of the image pickup apparatus 1B can be reduced, as compared with that of an image pickup apparatus including two image pickup devices.

3. Third Embodiment

Figure 13:
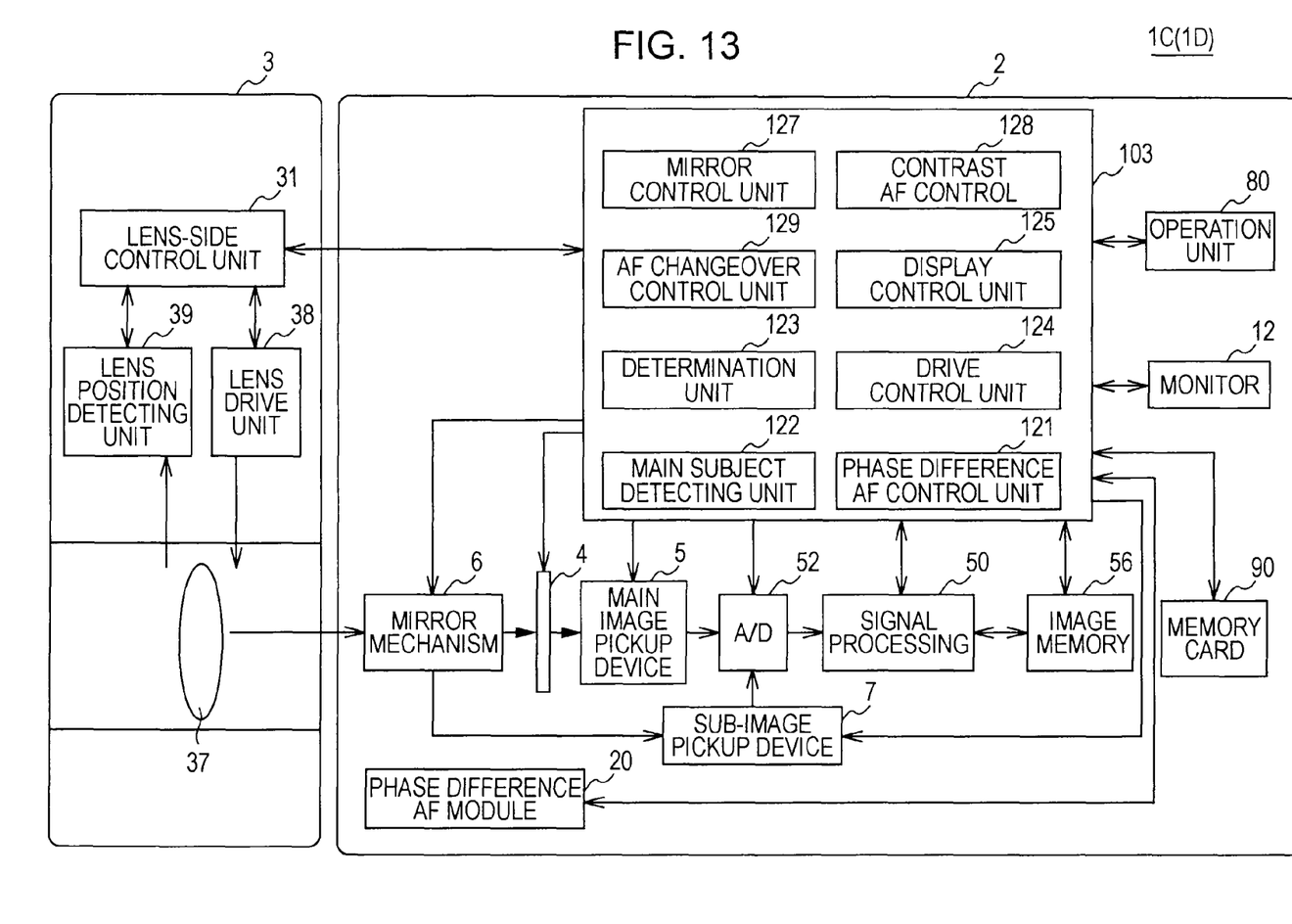
FIG. 13 is a block diagram of the functional structure of an image pickup apparatus according to a third embodiment.

A third embodiment of the present invention is described next. The image pickup apparatus 1A according to the first embodiment performs a phase difference AF operation. However, an image pickup apparatus 1C according to the third embodiment further includes a contrast AF control unit 128. When a face region is detected and if the face area FG is not present in the ranging area, a contrast AF operation (contrast AF) is performed in place of the phase difference AF operation. FIG. 13 is a block diagram of the functional structure of the image pickup apparatus 1C according to the third embodiment.

According to the third embodiment, the image pickup apparatus 1C has a configuration and functions similar to those of the image pickup apparatus 1A (refer to FIGS. 1, 2, and 3). However, unlike the image pickup apparatus 1A, as shown in FIG. 13, the image pickup apparatus 1C includes the contrast AF control unit 128 and an AF changeover control unit 129. Hereinafter, the differences from the first embodiment are mainly described.

The contrast AF control unit 128 shown in FIG. 13 performs a contrast autofocus (AF) operation on the basis of an image signal acquired by the sub-image pickup device 7. More specifically, the contrast AF control unit 128 performs an evaluation value computing operation and a lens focus position identifying operation. In the evaluation value computing operation, an evaluation value is computed in accordance with the contrast of a subject image in each of a plurality of captured images corresponding to different lens positions. In the lens focus position identifying operation, a lens position at which the evaluation value is optimized (e.g., minimized) is identified as a lens focus position. In addition, the contrast AF control unit 128 performs a lens driving operation in which the image capturing lens (the focus lens) is moved to the lens focus position in cooperation with the drive control unit 124.

In addition, the AF changeover control unit 129 performs a switching operation in which the AF method is switched between phase difference AF and contrast AF.

The AF operation performed by the image pickup apparatus 1C according to the present embodiment is described next.

Figure 14:
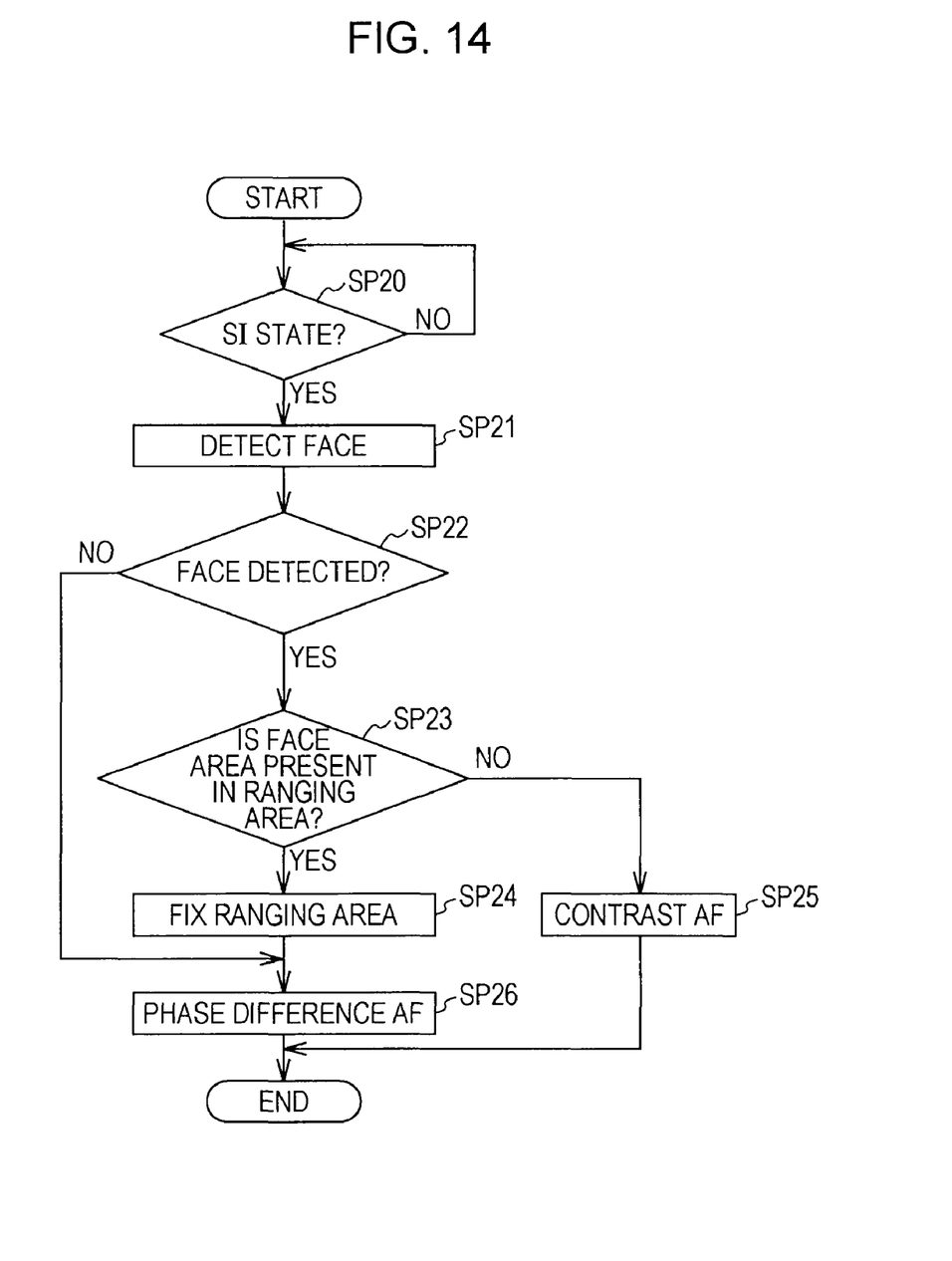
FIG. 14 is a flowchart of an autofocus operation performed by the image pickup apparatus according to the third embodiment.

FIG. 14 is a flowchart of the AF operation performed by the image pickup apparatus 1C according to the third embodiment.

As shown in FIG. 14, in steps SP20 to SP22, the image pickup apparatus 1C performs operations similar to those in steps SP10 to SP12 performed by the image pickup apparatus 1A (refer to FIG. 7). The face of a person is detected from an image captured by the sub-image pickup device 7, and the face area FG is identified.

Subsequently, if, in step SP23, it is determined that the face area FG is present in the ranging area, the processing proceeds to step SP24. In step SP24, the ranging area is fixed. Thereafter, a phase difference AF operation is performed on the basis of a phase difference detection signal acquired from the particular fixed ranging area (step SP26).

However, if, in step SP23, it is determined that the face area FG is not present in the ranging area, the processing proceeds to step SP25. In step SP25, the AF method is changed by the AF changeover control unit 129. An evaluation value computed in accordance with the contrast of the subject image in the detected face area FG in the image captured by the sub-image pickup device 7 is acquired, and contrast AF is performed using the evaluation value.

As described above, according to the present embodiment, when the face region is detected and if the face area FG is not present in the ranging area, the image pickup apparatus 1C performs a contrast AF operation using the face area FG as a ranging area in place of performing the phase difference AF operation. In this way, by switching the AF method used for predetermined control for preventing an unfocused state of the main subject, the probability of an image in which a main subject is out of focus being captured can be decreased. Thus, a desired captured image in which the main object is in focus can be obtained.

4. Modifications

While various embodiments of the present invention have been shown and described herein, the present invention is not limited to the teachings of the embodiments.

Figure 15:
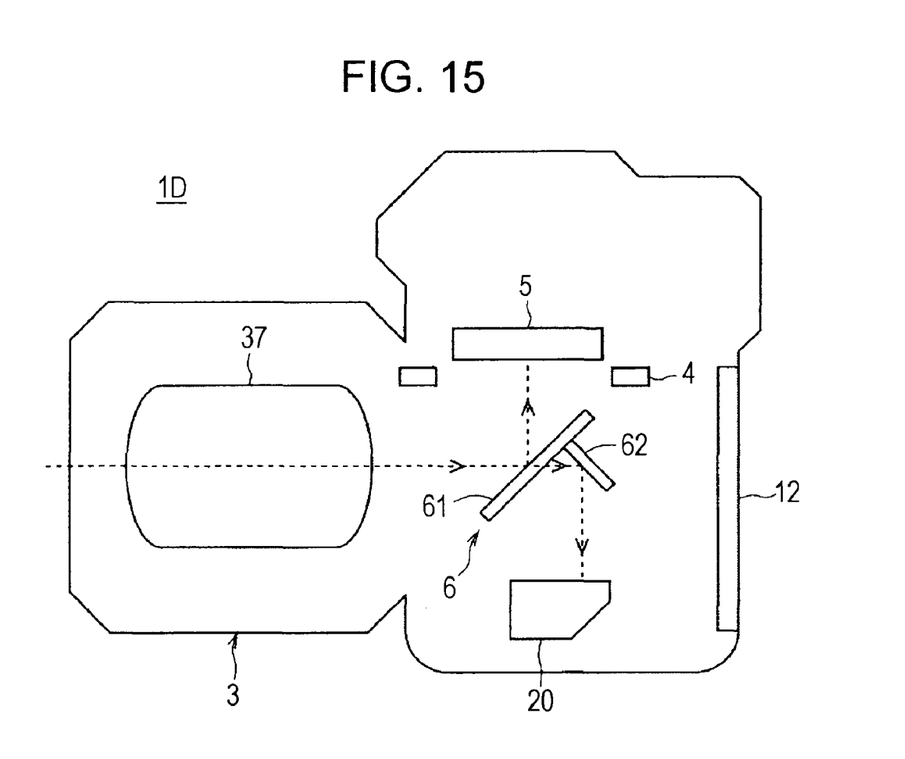
FIG. 15 is a cross-sectional view of an image pickup apparatus according to a modification.

For example, while the second embodiment has been described with reference to the case in which the mirror mechanism 6 is operated in accordance with the pressing state of the release button 11, the face of a person is detected from an image captured by the single image pickup device 5, and the face area is identified, the present invention is not limited thereto. FIG. 15 is a cross-sectional view of an image pickup apparatus 1D according to a modification of the embodiment.

More specifically, as shown in FIG. 15, the image pickup apparatus 1D includes an image pickup device 5 at a position at which a subject image reflected upwards by a mirror mechanism 6 is formed. Accordingly, the face of a person can be detected from the image captured by the main image pickup device 5 without operating the mirror mechanism 6 in accordance with the pressing state of the release button 11. Thus, it can be identified whether the face area FG is present in the ranging area. Furthermore, a time lag occurring due to the operation of the mirror mechanism 6 can be eliminated.

Still furthermore, the image pickup apparatus 1D may include the contrast AF control unit 128 (refer to FIG. 13) that performs contrast AF using an image captured by the image pickup device 5. In such a case, even the image pickup apparatus 1D including only one image pickup device 5 can perform contrast AF in place of phase difference AF when a face region is detected and if the face area is not present in the ranging area.

Figure 16:
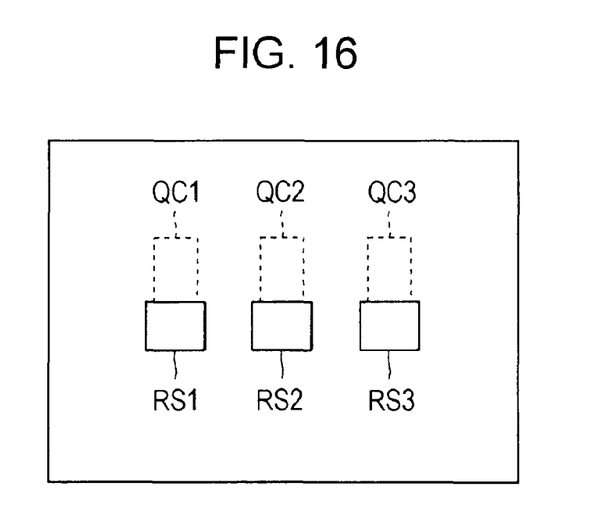
FIG. 16 is a diagram illustrating a relationship between a ranging area and a ranging available area in an auxiliary image.

In addition, while the foregoing embodiments have been described with reference to a "face of a person" serving as a main subject to be focused upon, the present invention is not limited thereto. For example, another particular part of the human body (e.g., a main body) may be a target to be focused upon. FIG. 16 illustrates a ranging area and a ranging available area in an auxiliary image.

More specifically, the main subject detecting unit 122 detects a face region from an auxiliary image and identified the face area FG including a face region. The determination unit 123 determines whether the face area FG is present in one of the ranging areas RS1 to RS3 or on of areas set above the ranging areas (also referred to as "ranging available areas") QC1 to QC3 (refer to FIG. 16). Here, the ranging available areas QC1 to QC3 are determined so that, if a face of a person is present in the ranging available areas, there is a high probability of the particular part of the body of the person being present in one of the ranging areas RS1 to RS3. Note that the size (range) of the ranging available area may be changed in accordance with the size of the detected face region.

Subsequently, if the determination unit 123 determines that the face area FG is not present in one of the ranging areas RS1 to RS3 or one of the available areas QC1 to QC3, predetermined control for preventing the unfocused state of the main subject is performed (e.g., a warning sign is output to the photographer).

The invention claimed is:

1. An image pickup apparatus comprising:
   an image pickup device for configured to capture an image relating to a subject image;
   a subject detecting unit configured to detect, from the captured image, a face region of a main subject set as a subject to be focused upon;
   a determination unit configured to, when the face region of the main subject is detected by the subject detecting unit, determine whether the face region of the main subject is present in one of a plurality of ranging areas;
   a first focusing unit configured to perform phase difference focus control on the basis of a phase difference detection signal acquired from a particular ranging area, of the plurality of ranging areas, set in an imaging area at a predetermined position, the face region of the main subject being present in the particular ranging area, and each of the plurality of ranging areas having a different phase difference detection signal; and
   a control unit configured to, if the determination unit determines that the face region of the main subject is not present in the plurality of ranging areas, perform predetermined control for preventing a state in which the face region of the main subject is not in focus.

2. The image pickup apparatus according to claim 1, wherein the main subject is a face of a person.

3. The image pickup apparatus according to claim 1, wherein the control unit is configured to output a warning sign if the determination unit determines that the face region of the main subject is not present in one of the plurality of ranging areas.

4. The image pickup apparatus according to claim 1, further comprising a second focusing unit configured to perform focus control on the basis of an image signal of the captured image, and if the determination unit determines that the face region of the main subject is not present in one of the plurality of ranging areas, the control unit performs focus control using the second focusing unit.

5. The image pickup apparatus according to claim 1, wherein the captured image is used for detection of the face region of the main subject and is used for a live view display.

6. An image pickup apparatus comprising:
   a first image pickup device configured to capture a first image relating to a subject image to be actually recorded;
   a second image pickup device configured to capture a second image relating to the subject image before the first image is actually recorded;
   a subject detecting unit configured to detect a face region of a main s
   a determination unit configured to, when the face region of the main subject is detected by the subject detecting unit, determine whether the face region of the main subject is present in one of a plurality of ranging areas;
   a first focusing unit configured to perform phase difference focus control on the basis of a phase difference detection signal acquired from a particular ranging area, of the plurality of ranging areas, set in an imaging area at a predetermined position, the face region of the main subject being present in the particular ranging area, and each of the plurality of ranging areas having a different phase difference detection signal; and
   a control unit configured to, if the determination unit determines that the face region of the main subject is not present in the plurality of ranging areas, perform predetermined control for preventing a state in which the face region of the main subject is not in focus.

* * * * *